F. W. IGGBERG.
COLLET CHUCK.
APPLICATION FILED MAR. 3, 1919.
1,403,415. Patented Jan. 10, 1922.
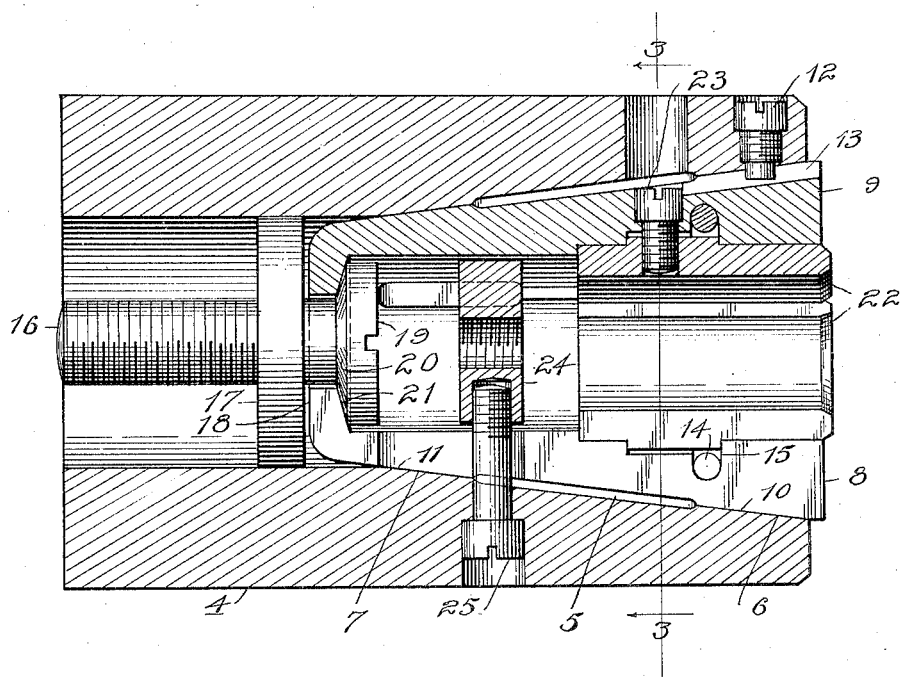
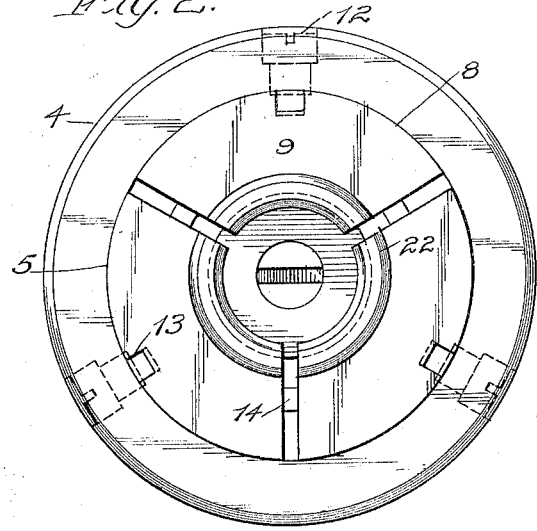
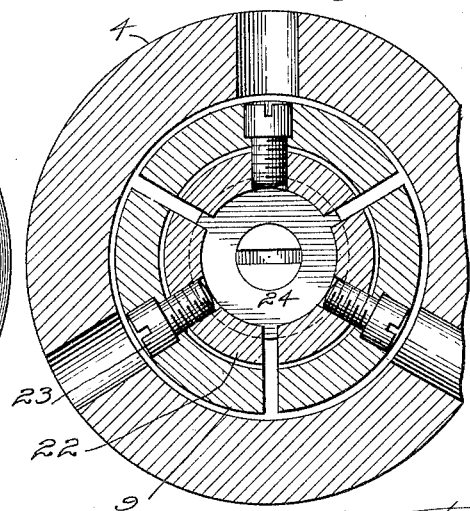
Witness:
R. L. Farrington
Inventor,
Frederick W. Iggberg.
By Glenn S. Noble, Atty.

UNITED STATES PATENT OFFICE.

FREDERICK W. IGGBERG, OF LOGANSPORT, INDIANA, ASSIGNOR TO LOGANSPORT MACHINE COMPANY, OF LOGANSPORT, INDIANA.

COLLET CHUCK.

1,403,415.　　　　Specification of Letters Patent.　　Patented Jan. 10, 1922.

Application filed March 3, 1919. Serial No. 280,347.

*To all whom it may concern:*

Be it known that I, FREDERICK W. IGGBERG, a subject of the King of Sweden, residing at Logansport, in the county of Cass and State of Indiana, have invented certain new and useful Improvements in Collet Chucks, of which the following is a specification.

This invention relates to chucks adapted for gripping and holding work pieces, and is especially applicable to chucks of this character which are manipulated by air or fluid pressure. In chucks of this character such as are now in use, the movement of the collet or jaw actuating portions is usually such that the jaws are slightly tipped, so that they do not have a parallel movement when they engage the article to be gripped.

One of the principal objects of the present invention is to provide a chuck in which the collet members are actuated so that the jaws will move in parallelism or in planes parallel to the axis of the chuck; another object is to provide a chuck having comparatively few parts, with the parts so designed that the chuck may be economically made; another object is to provide a chuck which will be particularly efficient and durable in operation; and other objects will appear from the following description.

In the accompanying drawings illustrating this invention:

Figure 1 is a longitudinal sectional view;

Figure 2 is an end view; and

Figure 3 is a cross section taken on line 3—3 of Fig. 1.

As shown in these drawings, 4 represents the chuck body or housing, which is preferably of cylindrical form, and has a conical or tapered chamber or opening 5 at the front end. The inner surface of the conical opening may be continuous throughout, but I prefer to have the central portion cut away so as to provide tapered seats 6 and 7 at the front and rear portions of the opening. The collet 8 may consist of any number of segments 9, which serve as jaws or jaw supporting members. The outer surface of the collet is made in a substantially conical form or tapered so as to correspond with the taper of the head or body portion 4, with which it engages.

The outer surface of the collet may also be continuous, but I prefer to have it cut away at the central part so as to form engaging seats 10 and 11 at the front and rear ends thereof, which seats engage with the seats 6 and 7 in the body portion. The seats 6 and 7 are of the same taper, so that the collet jaws 9 will move in parallelism as the jaws slide back and forth on these seats. In other words, the front and rear ends of the jaws will move radially the same distance during the longitudinal movement. These jaws are preferably held in circumferential position in the housing 4 by means of studs 12, the inner ends of which engage with slots 13 in the jaws 9. The front ends of the jaws are urged apart or to open position by means of an annular spring 14, which rests in an inner circumferential groove 15.

The collet is moved back and forth by means of a draw stud or bolt 16, which carries a disc 17 which is adapted to engage with the rear ends 18 of the jaws, to press them forwardly or to open position. The bolt 16 has a head 19, which is tapered on the under side as indicated at 20, for engagement with the correspondingly tapered faces 21 on the inwardly extending portions of the ends 18. This taper permits the radial movement of the rear ends while at the same time serving to urge the inner ends outwardly to hold the engaging portions 11 of the collet jaws against the seat 7.

The inner faces of the jaws may be formed in any suitable manner for engagement with the work pieces, but I prefer to provide removable segments or auxiliary jaw members 22, which are held in the jaws 9 by means of screws 23. These replaceable jaw members may be made to fit different kinds of work pieces and may be readily changed or renewed.

I also provide a stop 24, which is held in position by screws 25 passing through the body or housing 24 and through suitable slots in the collet. This stop serves as a guide for the stock or material which is to be held in the chuck.

It will be noted that the chuck may be made in various sizes and forms for different work, and the parts may be changed without departing from the scope of this invention.

Having thus described my invention, what I claim is:

1. A collet chuck comprising a housing, having a tapered seat in the end thereof, a collet composed of a plurality of jaws mounted in said seat and having its outer surface tapered to engage with the seat, said jaws having inwardly extending projections at their rear ends with tapered front faces, a draw bolt having a tapered head engaging with the front faces of said projections, and a disc carried by said bolt and slidably mounted in the housing, said disc being adapted to engage with the rear faces of said projections.

2. The combination of a housing having a central cylindrical bore, and having an annular longitudinally tapered seat in the front end thereof, a collet composed of a plurality of jaws, mounted in said recess, and having its outer surface tapered to engage with said seat, said jaws having inwardly extending projections at their rear ends, a draw bolt having a head engaging with the front faces of said projections, a disc carried by said bolt and slidably mounted in the bore of the housing, said disc being adapted to engage with the rear faces of said projections, an annular spring fitting in a groove in the jaws and tending to force the jaws outwardly, auxiliary jaw members secured in said collet jaws and covering said groove, a stop mounted in said collet, and screws engaging with said housing and stop for holding the stop, said stop being adapted to be engaged by the first named screw head for limiting the movement of the collet.

FREDERICK W. IGGBERG.